United States Patent [19]

Drum et al.

[11] Patent Number: 5,585,122

[45] Date of Patent: Dec. 17, 1996

[54] APPARATUS FOR CONVERTING RAW MATERIALS INTO A MOLDED END PRODUCT

[75] Inventors: Kenneth H. Drum, Brenham; David Lewer, Washington; Vernon Havemann, Caldwell, all of Tex.

[73] Assignee: Reconversion Technologies, Inc., Brenham, Tex.

[21] Appl. No.: 363,699

[22] Filed: Dec. 23, 1994

[51] Int. Cl.⁶ .......................... B29C 45/13; B29C 45/18; B29C 45/53

[52] U.S. Cl. .................. 425/182; 264/DIG. 69; 425/190; 425/200; 425/449; 425/585

[58] Field of Search .................. 264/DIG. 69; 425/182, 425/183, 190, 200, 447, 449, 548, 585

[56] References Cited

U.S. PATENT DOCUMENTS

| | | | |
|---|---|---|---|
| 2,041,223 | 5/1936 | Bollman | 106/23 |
| 2,358,956 | 9/1944 | Ashbaugh | 425/585 |
| 2,382,655 | 8/1945 | Nichols | 264/DIG. 69 |
| 2,392,691 | 1/1946 | Popham | 260/768 |
| 2,477,258 | 7/1949 | MacMillin | 425/585 |
| 2,486,346 | 10/1949 | Wachs | 264/DIG. 69 |
| 2,593,681 | 4/1952 | Leydon | 260/33.6 |
| 3,267,187 | 8/1966 | Slosberg et al. | 264/122 |
| 3,338,849 | 8/1967 | Johnson | 260/4 |
| 3,386,925 | 6/1968 | Dillhoefer | 260/2.3 |
| 3,401,128 | 9/1968 | Terry | 260/2.5 |
| 3,489,710 | 1/1970 | Bonotto et al. | 260/33.6 |
| 3,594,335 | 7/1971 | Schultz et al. | 260/2.5 |
| 4,028,288 | 6/1977 | Turner | 260/2.3 |
| 4,225,640 | 9/1980 | Erb | 264/DIG. 69 |
| 4,588,365 | 5/1986 | Holzschuh | 425/183 |
| 5,022,847 | 6/1991 | Hehl | 425/585 |
| 5,157,082 | 10/1992 | Johnson | 525/237 |
| 5,312,573 | 5/1994 | Rosenbaum et al. | 264/DIG. 69 |
| 5,346,171 | 9/1994 | Kephart | 425/195 |

FOREIGN PATENT DOCUMENTS

| | | |
|---|---|---|
| 2408690 | 9/1974 | Germany . |
| 1464860 | 2/1977 | United Kingdom . |

OTHER PUBLICATIONS

"Earth Matters" by Ford Motor Company, Summer 1994, pp. 1–7.

Primary Examiner—James P. Mackey
Attorney, Agent, or Firm—Catalano, Zingerman & Associates

[57] ABSTRACT

A recycling apparatus in which high density polyethylene, thermal polyolfin, or coated or non-coated oriented polypropylene and rubber are mixed into a batch and converted to useful molded products. The apparatus includes a first mixer, a second mixer, a conveyor belt system, a deflector sheet, a first ram, a second ram, a conduit system, and a mold. The first and second mixers alternately provide a batch to the conveyor belt system. The conveyor belt system alternately transports the batches to a first and second ram. Each ram having an opening, an outlet, and a ram piston. A deflector sheet or flip plate permits a first batch on the conveyor belt to be deposited into the opening of the first ram in a first position and alternately permits a second batch on the conveyor belt to be deposited into the opening of the second ram in a second position. The outlets from the rams are connected to a common conveying conduit which takes the molten batch product from the rams to a mold for molding into a molded end product.

13 Claims, 4 Drawing Sheets

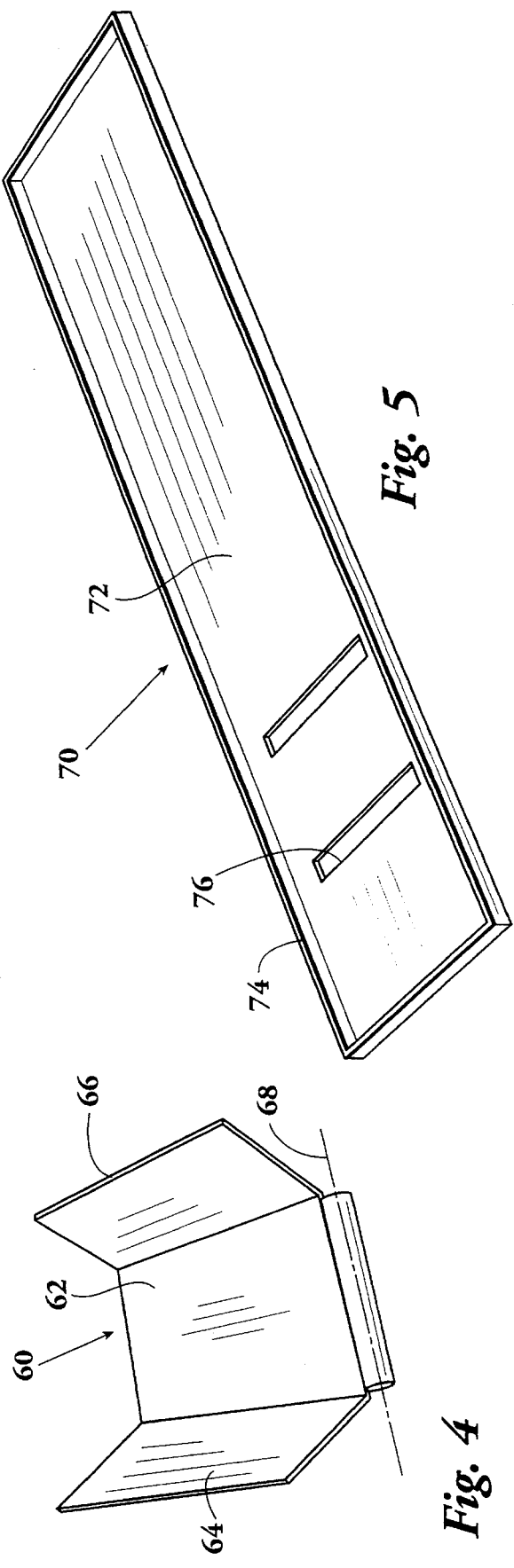
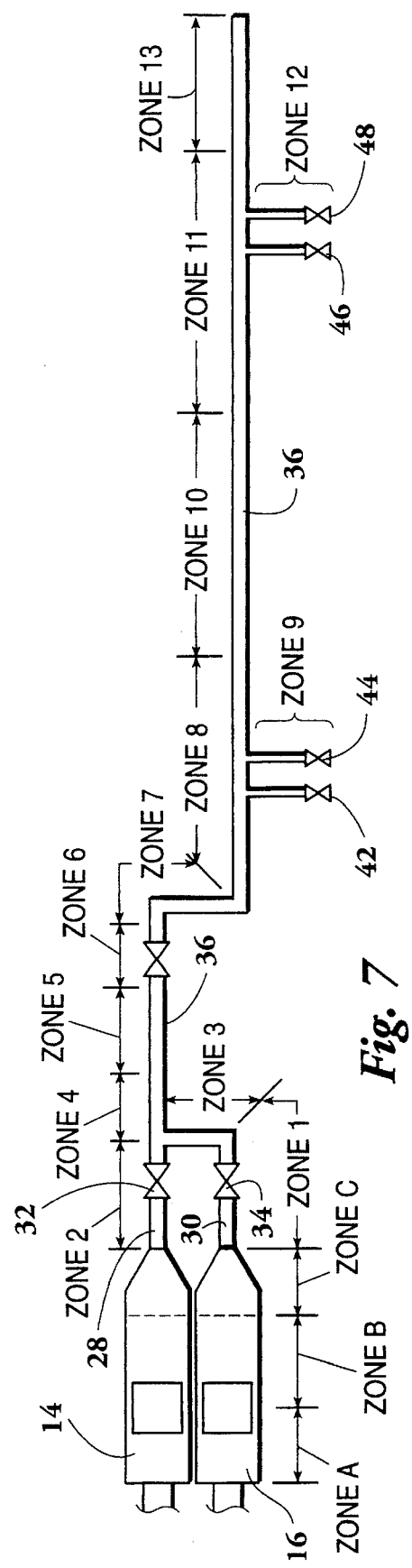

APPARATUS FOR CONVERTING RAW MATERIALS INTO A MOLDED END PRODUCT

BACKGROUND OF THE INVENTION

This invention relates to the recycling of raw materials which are mixed and press molded into various useful products.

Recycling of waste material is becoming important both economically and socially to recycle many waste products into new products.

An example of recycling is described in U.S. Pat. No. 4,028,288, Turner, "Moldable End Products from Primarily Reclaimable Waste Material" which describes provision for reclaiming waste rubber and scrap plastic resins for use in making molded end products. The patentee describes a material composition comprised of a mixture of particularized rubber tires including the fibrous cord content and plastic resin waste material. In that process, the plastic end product is variable in proportion to the size of the rubber material bits and the relative amount, by weight, of these bits in the molding material mixture.

SUMMARY OF THE INVENTION

Generally speaking, this is a recycling process in which the recycled material includes: A raw material (1) which is high density polyethylene, raw material (2) which is thermal polyolfin or coated or non-coated oriented polypropylene and raw material (3) which is rubber (no cords, wire or otherwise) such as shavings from car tires. These three raw materials are mixed, heated, and press molded into various useful products.

One embodiment of this invention is a recycling process in which these three raw materials are converted to a useful product. First obtain chips of the raw materials, all in approximately the size of about ¼ to 2" in diameter. Mix these particles of the three raw materials in a mixer to at least partially melt and mix them. The heated raw materials are thus mixed together to obtain a mixed batch. The batch is not quite molten but is soft, and is somewhat like a large lump. The batch is then conveyed to a cylindrical ram where the batch is heated to obtain a molten substance. The molten substance is then used to obtain a molded product.

A special apparatus for carrying out this process includes a first mixer, a second mixer, and a conveyor belt. The first and second mixers alternately provide a batch to the conveyor belt system. There's a first and a second ram, each having an opening, an outlet, and a ram piston. The opening of the first ram is in a position to receive the discharged mixture batch from the conveyor belt system. There is provided a deflector sheet or flip plate such that in one position it permits the mixture on the conveyor belt to drop into the opening of the first ram and when in the second position permits the mixture from the conveyor to be dropped into the opening of the second ram. There are outlet valves for closing the outlet of each ram. The outlets from the outlet valves are connected to a common conveying conduit which takes the molten product from the rams to a mold for molding the molten material into a molded end product such as a trailer floor for livestock trailers.

There is also a special mold for forming a floor for a livestock trailer, a board, or sheet which includes an open pan having a wall and pattern slots in the bottom thereof. The pan is adapted to receive the molten substance conveyed from the rams. The molten substance extends above the walls of the pan. A pressure plate is then applied to the molten substance. Pressure is then applied to compress the molten material to remove most of the air pockets therein. The pressure is held until the material sets sufficiently to maintain its shape.

It is thus an object of this invention to provide an apparatus for converting particles of high density polyethylene, thermal polyolfin, and rubber into a moldable substance.

Other objects and a better understanding of this invention will be had from the following description and the drawings in which:

BRIEF DESCRIPTION OF THE DRAWINGS

FIG. 4 is an isometric view of the flip plate of FIGS. 2 and 3.

FIG. 5 illustrates a mold in the shape of a relatively flat rectangular pan with patterns cut in the bottom thereof.

FIG. 7 illustrates a thermal system for heating the conveying conduits by zones.

DETAILED DESCRIPTION OF THE PREFERRED EMBODIMENT

Figure 1:
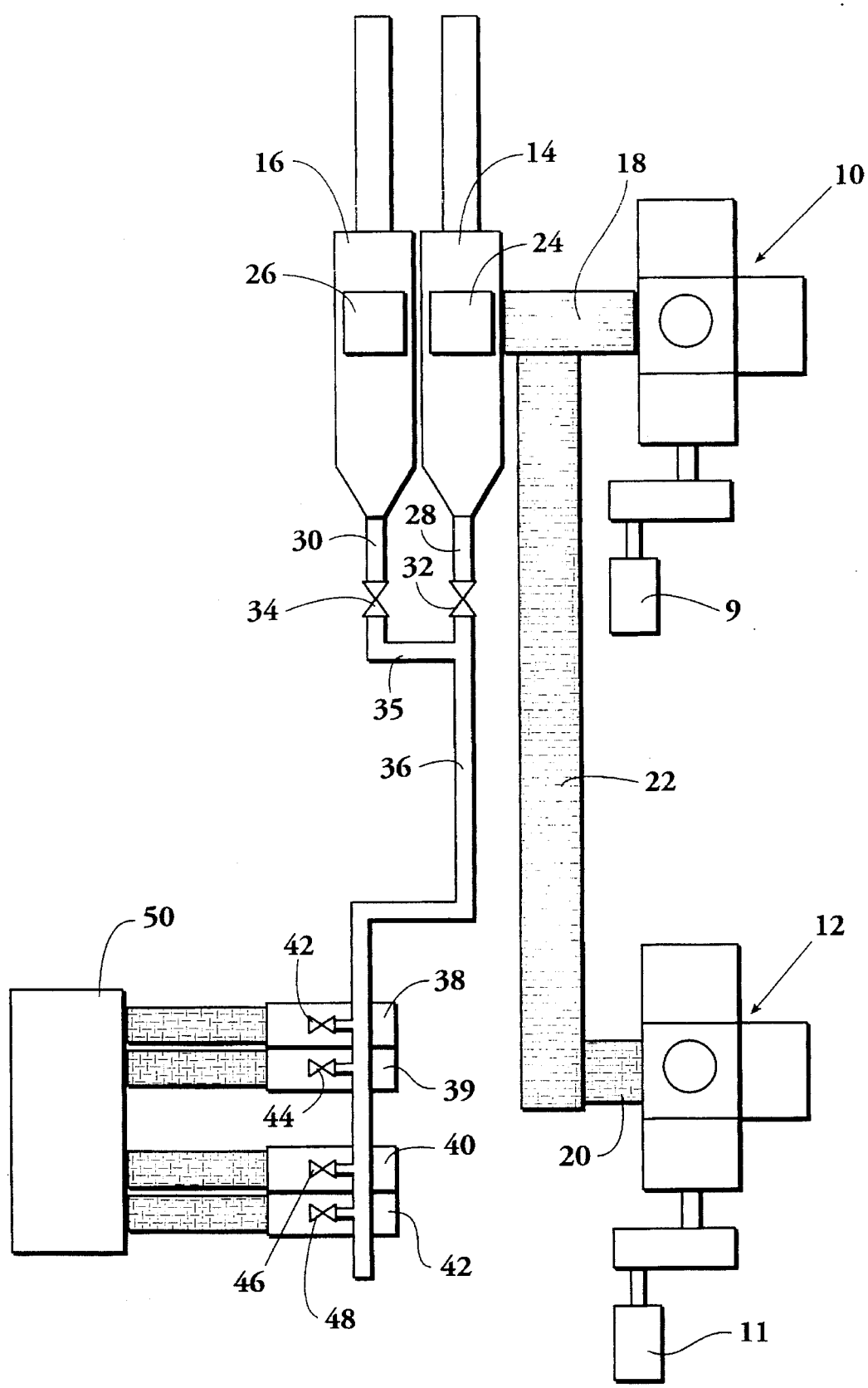
FIG. 1 is a schematic drawing showing the overall apparatus used for carrying out the process of this invention.
Figure 2:
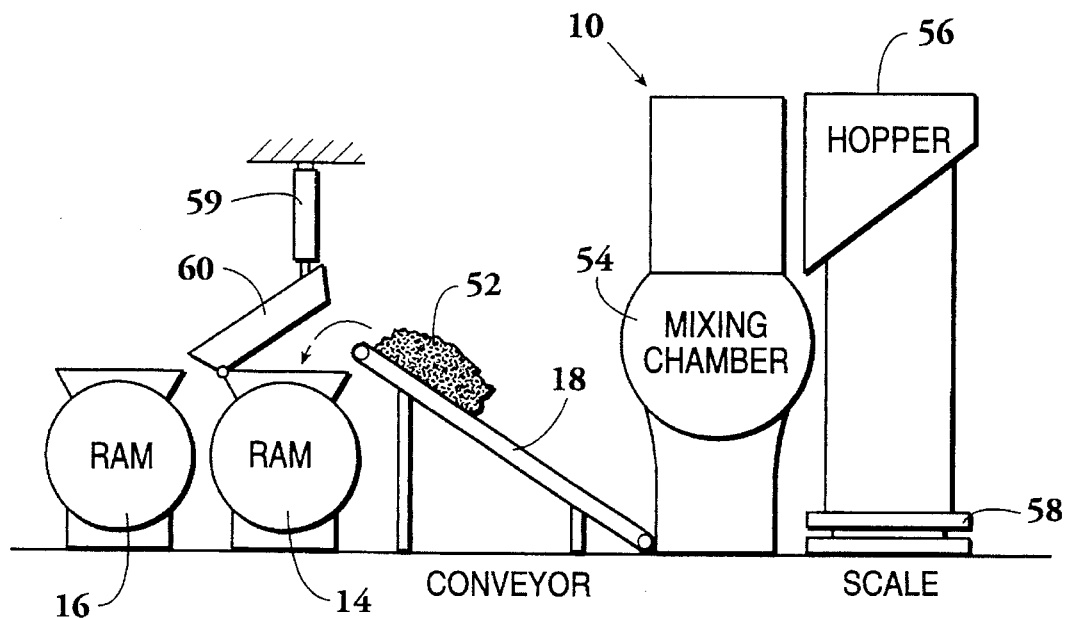
FIG. 2 is another schematic showing how the batch from the mixing chamber is conveyed to one of the rams.
Figure 3:
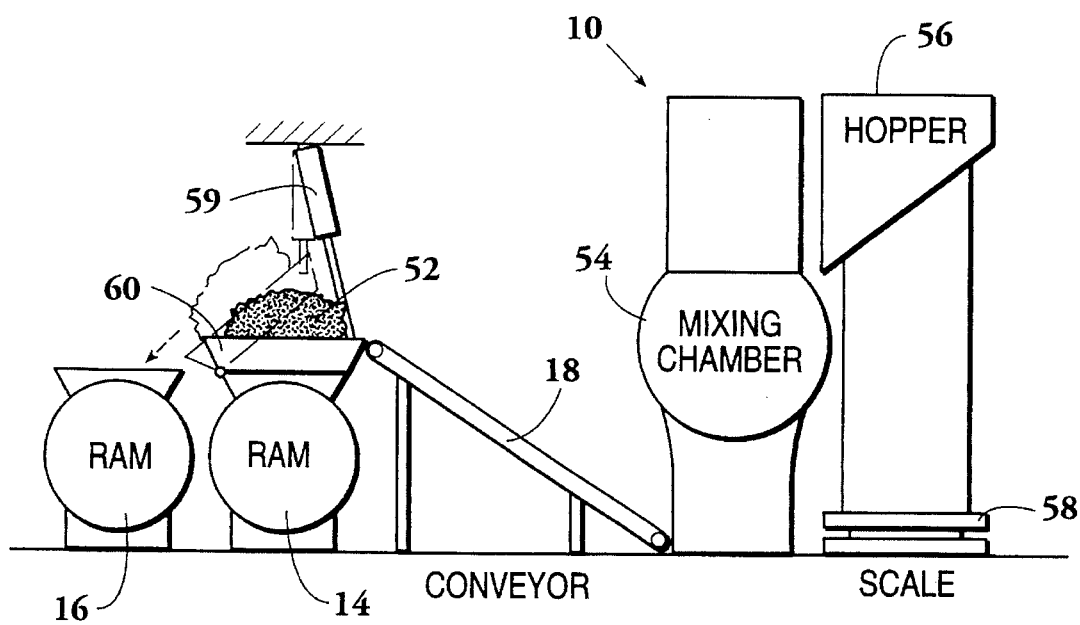
FIG. 3 is similar to FIG. 2 except it illustrates a flip plate in the down position so that the batch from the mixer can be transferred to the second ram.

Attention is first directed to FIG. 1 which shows in schematic form the various components of an apparatus for carrying out the process described in this invention. Shown thereon is a first mixer 10 and a second mixer 12. These mixers may be mixers commonly used in the plastic industry and may be one which is known as a Banbury mixer. Each mixer has a motor 9 and 11 with associated gearing and controls. The mixed batch of each mixer is deposited on a conveyor system which selectively feeds to the inlet of each of two rams 14 and 16. The conveyor system includes a belt conveyor 18 extending from the mixer 10 to the ram group, a conveyor belt 20 adapted and positioned to receive a batch from the mixer 12, and a belt conveyor 22 which conveys the batch from conveyor 20 to conveyor 18. The batch from mixer 12 can also be fed alternately or selectively to ram 14 or ram 16. As shown in FIGS. 2, 3, and 4, means are provided so that one can select whether to discharge the batch from conveyor 18 to ram 14 or to ram 16.

Sufficient pressure is provided by the ram on each batch to put it in a molten condition. The material is then flowed alternately out through ram outlets 28 and 30 having valves 32 and 34 respectively into feed lines or conduits 35 and 37 which connects to main conduit 36 which leads to molds 38, 39, 40, and 42 through outlet valves 42, 44, 46, and 48. The pans are overfilled or stacked with the molten substance to above the wall of the frame. The pans or molds are then conveyed to press 50 to compress the molded material sufficiently to obtain the designed product.

Attention is now directed to FIGS. 2, 3, and 4 to more clearly show how the batch 52 is conveyed from conveyor 18 to a selected ram 14 or 16. Shown in FIG. 2 is the mixer 10 having a mixing chamber 54 and a loading hopper 56 with scales 58. This permits a selected weight of raw material to be added to hopper 56 and weighed by scales 58. When the desired amount of one of the raw materials is provided, the hopper door is released to let that amount flow into mixing chamber 54. The mixing chamber mixes the raw material supplied into a batch 52, which when the mixing chamber 54 is opened, will fall onto conveyor 18.

There is a flip plate 60 which when in the up position shown in FIG. 2 permits the batch 52 to be conveyed up over the end of conveyor 18 and fall into the opening of the ram 14. The flip plate 60 itself is shown more clearly in FIGURE 4. Shown thereon is a bottom plate 62 having sloping sides 64 and 66. The plate is rotatable about an axis 68 supported from or near from ram 14 so that the plate can be rotated alternately between the position shown in FIG. 2 and in FIG. 3. Mechanical means 59 may be provided to raise and lower flip plate 60 with or without batch 52 thereon. This means may be in the form of an air cylinder. Alternatively, if the batch 52 is not too heavy, the means 59 may be omitted, and the plate 60 lifted manually. When it is desired to have the batch 52 dropped into ram 16, the flip plate 60 is dropped to the position shown in FIG. 3. The blob or batch 52 from conveyor 18 then is conveyed to the top of plate 60. After batch 52 is deposited on flip plate 60, the plate 60 can be raised either manually or by mechanical means 59. This causes the batch 52 to slide into ram 16.

FIG. 5 shows a mold in the form of a pan 70. It has a relatively flat bottom 72 with sides 74 around the periphery of the bottom. It also has slots 76 cut into the bottom 72. It should be understood that the size of the mold 70 can be anything that is desired and that the slots 76 can be of any shape that one might wish to have the mold depict or it may be that the slots 76 will be nonexistent. This latter might be the case if board-like materials were made. Typical dimensions for the mold of FIG. 5 may be about eight feet (8') long by fourteen (14) to fifteen (15) inches wide. The height of the walls or sides 74 is about one and one-half inches (1½"). These dimensions can, of course, vary but have been found to be suitable for the process which will be explained hereinafter. It should also be noted that the mold could comprise several of these mold units of FIG. 5 in a side-by-side relationship.

Means are provided so that additional heat can be applied to rams 14 and 16 by electrical tube heaters attached to the outside of the ram cylinders in three zones (A,B, or C) as indicated in FIG. 7. We wish to maintain the ram inside temperature adjacent its wall to about 350° F. for Zone A, 400° F. for Zone B, and 440° F. for Zone C. FIG. 7 also identifies zones for the conveying conduits, i.e. outlet 30 and valve 34 for Zone 1, outlet 28 and valve 32 for zone 2, feeder conduit 35 in Zone 3. Feed conduit 36 is divided into Zones 4, 5, 6, 7, 8, 10, 11, and 13. Zone 9 covers the discharge system including valves 42 and 44, and Zone 12 covers the discharge system having discharge valves 46 and 48. Zones 4, 5, 6, 7, 8, 10, 11, and 13 may vary in length from about four feet to twelve feet and are heated individually by band and nozzle or tubular type heaters which each has an individual control to maintain proper heat in the conduit within that zone.

It will now be described how this apparatus is used with a recycling process in which a raw material (1) high density polyethylene, raw material (2) thermal polyolfin, and raw material (3) rubber are melted, mixed, and press molded into various useful products. The waste rubber can be obtained such as from non-metallic car bumpers or tire buffings (without cords, etc.) In one recycling process, raw material (1) by weight is in the range of approximately sixty (60%) to eighty (80%) percent of the material to be dumped into mixers 10 and 12. Raw material (2) may be in the range of ten (10) to thirty (30) percent, and raw material (3) may be in the range of five (5) to thirty (30) percent. A very good source of raw materials (2) and (3) is scrap car bumpers which may have a raw material breakdown of sixty percent (60%) thermal polyolfin and forty percent (40%) rubber.

Each raw material is obtained in a particle form, preferably in a chip form, ranging from one-quarter inch (¼") to two inches (2") in diameter. Each of the raw materials is dumped into a scaled hopper and in a preferred embodiment is measured to a ratio of approximately sixty percent (60%) for raw material 1), thirty percent (30%) for raw material (2), and ten percent (10%) for raw material (3), plus or minus five percent (5%). The raw materials are then fed to either hopper 10 or 12 or both and filled into the mixing chamber of a Banbury mixer in quantities based on the capacity of the mixing chamber 54 to be within the above guidelines. In a typical mixer, two mixing paddles work in opposition, turning and pounding the product against the walls of the mixing chamber. A top portion of the mixing chamber is pushed against the product by an air actuated cylinder in pressures of 90 to 120 psi. The pressure created in the mixing chamber tends to melt and mix the raw materials together after a ten (10) to seven (7) minute period. The rubber causes friction which increases the heat obtained. Upon completion, the batch is dumped onto a belt conveyor system, conveyor 18 for mixer 10, and conveyors 20 and 22 for mixer 12, and is fed into either cylindrical ram 14 or 16. To feed into ram 14, the flip plate is in the position shown in FIG. 2. The batch 52 then is conveyed up an incline of conveyor 18 where it falls into ram 14. After each mold is dropped into the ram chamber, the hydraulic ram is actuated to push the product to the front of the chamber and then retracted to receive other loads until the cylinder is full. When ram 14 is fully loaded, the hydraulic system is actuated so that the piston forces the batches 52 to become a molten mass with the temperature being between about 280° and 350° F. When the hydraulic line pressure servicing the ram 14 reaches a desired value, e.g. 850 psi, valve 32 is opened either automatically or manually, and the molten material flows through feed line 36 to one of the molds 38, 40. Valve 32, which may be a six inch (6") actuated full port ball valve with 300 lb. rating, is provided to prevent backflow, when closed, from the feed line 36 during the loading of the ram 14. Likewise, valve 30, when closed, prevents backflow of feed line 36 during the loading of ram 16. The hydraulic rams are used in alternating sequence to maintain constant pressure on the material in the feed lines. Typically, the feed lines 36 are six inch (6") 150 lb. rated carbon steel service lines. Line 36 is provided with multiple zones of heating. It is required that the material stays molten until it can be discharged through valves 42 and 44 into molds 38 and into valves 46 and 48 into mold 40.

The heat of the molten substances in conveying conduits 30, 35, 28, and 36 and accompanying valves is such as to keep the processed substance in a molten state until it is discharged into the molds. As set forth above and in FIG. 7, the zones are individually heated. We normally keep the heat in the zone closest to the rams at the highest temperature with progressively lower temperatures to zone farthest from the rams but of sufficient heat to keep the substance in the conveying conduits at a temperature to flow. Typically the temperature in the zones may be:

| ZONE | TEMPERATURE ___ TO ___ °F. |
| --- | --- |
| 1 | 350° F.–410° F. |
| 2 | 350° F.–410° F. |
| 3 | 350° F.–410° F. |
| 4 | 320° F.–370° F. |
| 5 | 320° F.–370° F. |
| 6 | 320° F.–370° F. |
| 7 | 310° F.–350° F. |
| 8 | 310° F.–350° F. |
| 9 | 310° F.–350° F. |
| 10 | 310° F.–350° F. |
| 11 | 310° F.–350° F. |
| 12 | 310° F.–350° F. |
| 13 | 310° F.–350° F. |

Molds 38 and 40 are such as described in FIG. 5. These disbursement valves 42, 44, 46, and 48 are actuated and reactivated from a control panel either manually or automatically by timers. Material is flowed from the valves into the molds located on a roller conveyor below. The molten substance is manually spread. The mold is slightly overfilled with the molding material to ensure a good finished product. Any suitable number of molds may be used.

Figure 6:
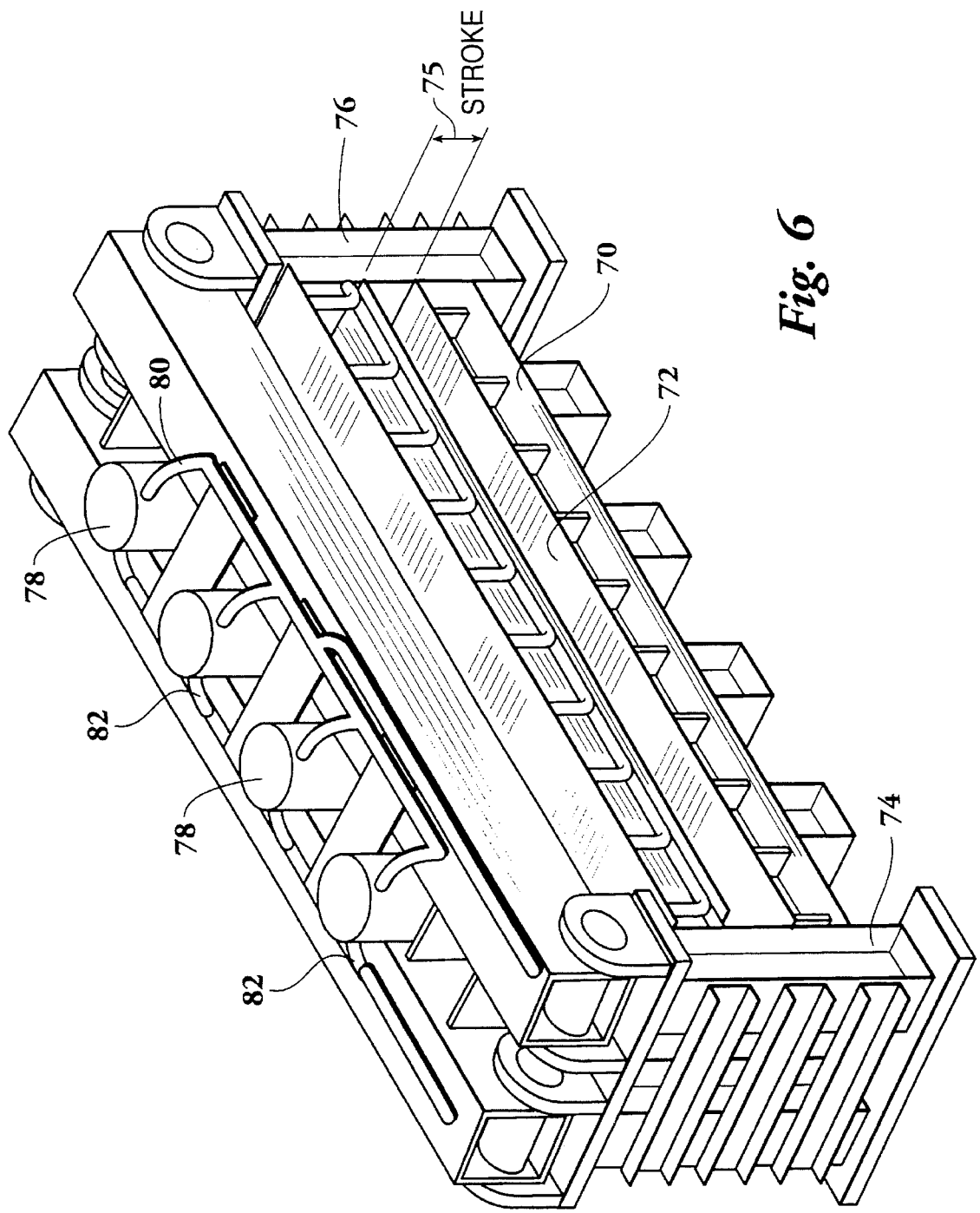
FIG. 6 illustrates a press which is used in conjunction with the mold of FIG. 5 to compress the molten substance in the mold.

After being slightly overfilled, e.g. twenty percent (20%) by weight, the mold is moved into a press immediately after filling is complete. A suitable press is shown in FIG. 6. Shown in FIG. 6 is a working area 70 and a pressure application plate 72. The working area 70 is supported by frame 74 and 76. The pressure plate 72 is supported from hydraulic cylinders 78. Each hydraulic cylinder 78 is provided with a pressure loading conduit 80 and a pressure relief conduit 82. The conduits have sufficient power to hold the plate 72 in the position shown in FIG. 6. There is a stroke 75 between plate 72 in its upper position and in its lower position against working area 70. Typically, the stroke could be seventeen (17) or eighteen (18) inches.

The filled molds 38 and 40 are moved onto the working area 70 by means (not shown but can be rollers or other type conveyors). The press is then actuated which squeezes the mold between the two platens 70 (working area) and 72 (pressure plate). This presses the molded material which extends above the walls 74 of the molds into the mold and the high pressure of at least 150 psi compacts the molded material and forces the air out of it to make a more firm material. Excess material is scraped away from the sides of the mold and collected and reprocessed in a mixer. The time required under the press varies from ten (10) to thirty (30) minutes, depending on the volume of the product and the ambient temperature in the plant. The press can be of any type which is capable of pressures of 250 psi or greater. Of course, the size of the press depends on the size of the mold for the desired finished product being produced.

After pressing is completed, the mold is pulled from the press onto a roller conveyor. The molded product is removed, clipped and trimmed, and laid flat to cool. The conveyor is set up in such a manner that more than one mold can be used to keep the press fully utilized. The finished product is cooled from one (1) to eight (8) hours, depending on the cubic inches of the product and ambient temperature in the plant.

The end product may be of many different designs. For example, it can be a livestock trailer flooring with the board press molded into various sizes with any selected number of raised strips as caused by slots 76 in FIG. 5 for the purpose of preventing the animals from slipping. The mold can be designed such that a flat sheet will be press molded in various sizes and shapes such as sections of plywood. It can also be designed for use in molding roof shingles. A lap shingle press molded into a detailed mold can give the exposed section of shingles the appearance of slate or cedar shake.

It is related above there are two rams 14 and 16 and that they operate alternately. This can be accomplished by loading the ram 14 in the position with the flip plate 60 in the position shown in FIG. 2 and to load ram 16 when the flip plate is in the position shown in FIG. 3. Ram 16 operates identically with the ram 14 except the heat chambers (of the rams) are used in alternating sequence to maintain constant pressure on the material in the feed lines.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. An apparatus for converting particles of raw materials into a moldable substance, comprising:

a first mixer and a second mixer, each mixer having opening means for receiving the particles to be mixed into a mixture and for discharging the particles after mixture;

a conveyor for receiving said mixture from said first and second mixers and conveying said mixture to an end location;

a first ram and a second ram, each having a shell with an inlet opening, an outlet, and a ram piston, the opening of said first ram being in a position to receive the mixture from said conveyor, each said ram being operable to compress said mixture;

a deflector sheet means positioned such that in one position it permits the mixture from the conveyor to drop into said first ram and when in a second position, permits the mixture from said conveyor to be dropped into the opening of said second ram.

2. An apparatus as defined in claim 1 including a conveyor conduit to convey the mixture from said first ram and said second ram;

a mold to receive the mixture through said conveyor conduit.

3. An apparatus as defined in claim 2 wherein the mold includes an open flat pan to receive the mixture, a pressure plate for placing over the received mixture, and means to force the pressure plate downwardly.

4. An apparatus as defined in claim 3 in which the bottom of the pan been machined to form slots.

5. An apparatus as defined in claim 2 in which said conveyor conduit is divided into a plurality of heating zones, each said zone having individual controls to maintain proper heat in the conveyor conduit within each said zone.

6. An apparatus as defined in claim 1 wherein said deflector sheet means includes a flip plate including a plate rotatably supported above said first ram and having opposite sides extending up, said flip plate supported such that in one position the opening of said first ram is open and when rotated to a second position such opening of said first ram is closed so that material from said conveyor is deflected into said second ram.

7. An apparatus according to claim 1 wherein said first mixer and said second mixer are Banbury mixers.

8. An apparatus according to claim 1 wherein said first ram and said second ram each include means for closing the outlet of said first ram and said second ram.

9. An apparatus according to claim 8 wherein said means for closing the outlet of said first ram and said second ram is an outlet valve.

10. An apparatus for converting particles of raw materials into a moldable substance, comprising:

a first Banbury mixer and a second Banbury mixer, each mixer having opening means for receiving the particles to be mixed into a molten substance and for discharging the molten substance after mixture;

a first ram and a second ram, each having a shell with an inlet opening, an outlet, and a ram piston, the opening of said first ram being in a position to receive the molten substances from a conveyor, each said ram being operable to compress said molten substances;

said conveyor for receiving said molten substances from said first and second Banbury mixers and conveying said molten substances to said first ram and said second ram;

a deflector sheet positioned such that in one position it permits a molten substance from the conveyor to drop into said first ram and when in a second position, permits a molten substance from said conveyor to be dropped into the opening of said second ram;

means for closing the outlet of each said ram;

means for compressing said molten substance into an end product;

means for transporting said molten substance from said first ram and said second ram to said means for compressing said molten substance into an end product.

11. An apparatus as defined in claim 10 wherein said means for compressing said molten substance into an end product includes a mold having an open flat pan to receive the molten substance, a pressure plate for placing over the received molten substance, and means to force the pressure plate downwardly.

12. An apparatus as defined in claim 10 in which said means for transporting said molten substance from said first ram and said second ram to said means for compressing said molten substance into an end product includes a conveyor conduit divided into a plurality of heating zones, each said zone having individual controls to maintain proper heat in the conveyor conduit within each said zone.

13. An apparatus according to claim 10 wherein said means for closing the outlet of each said ram is an outlet valve.

* * * * *